(12) United States Patent
Wang et al.

(10) Patent No.: US 12,131,021 B2
(45) Date of Patent: Oct. 29, 2024

(54) EFFICIENT INCREMENTAL JOURNAL TRUNCATION POLICY

(71) Applicant: VMware LLC, Palo Alto, CA (US)

(72) Inventors: Wenguang Wang, Santa Clara, CA (US); Jiaqi Zuo, Santa Clara, CA (US); Hardik Singh Negi, Sunnyvale, CA (US); Eric Knauft, San Francisco, CA (US); Junlong Gao, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 232 days.

(21) Appl. No.: 17/929,204

(22) Filed: Sep. 1, 2022

(65) Prior Publication Data

US 2024/0078010 A1   Mar. 7, 2024

(51) Int. Cl.
*G06F 3/06* (2006.01)
*G06F 11/14* (2006.01)
*G06F 16/22* (2019.01)

(52) U.S. Cl.
CPC .......... *G06F 3/0604* (2013.01); *G06F 3/0655* (2013.01); *G06F 3/0673* (2013.01); *G06F 16/2246* (2019.01); *G06F 11/1446* (2013.01)

(58) Field of Classification Search
CPC .... G06F 3/0604; G06F 3/0655; G06F 3/0673; G06F 3/0608; G06F 3/0667; G06F 3/067; G06F 3/0665; G06F 12/08; G06F 11/0712; G06F 11/0745; G06F 11/141; G06F 11/1446; G06F 11/1448; G06F 11/1471; G06F 11/1474; G06F 16/20; G06F 16/2246
See application file for complete search history.

(56) References Cited

U.S. PATENT DOCUMENTS

| | | | |
|---|---|---|---|
| 9,003,162 B2 * | 4/2015 | Lomet | G06F 16/2246 707/999.2 |
| 10,601,890 B2 * | 3/2020 | Douros | H04L 67/01 |
| 10,725,967 B1 | 7/2020 | Natanzon | |
| 11,567,872 B1 | 1/2023 | Pillai | |
| 2012/0011106 A1 | 1/2012 | Reid | |
| 2016/0313943 A1 | 10/2016 | Hashimoto | |
| 2016/0371190 A1 | 12/2016 | Romanovskiy | |
| 2017/0032005 A1 | 2/2017 | Zheng | |
| 2020/0019620 A1 | 1/2020 | Sarda | |
| 2020/0175074 A1 | 6/2020 | Li | |
| 2021/0294499 A1 | 9/2021 | Wang | |
| 2021/0349850 A1 | 11/2021 | Carey | |

* cited by examiner

*Primary Examiner* — Idriss N Alrobaye
*Assistant Examiner* — Richard B Franklin
(74) *Attorney, Agent, or Firm* — King Intellectual Asset

(57) ABSTRACT

A method for efficient journal truncation is provided. A method for journal truncation includes maintaining a journal in a memory of a computing system including a plurality of records. Each record indicates a transaction in an ordered data structure. The method includes maintaining a truncation queue in the memory including one or more entries. Each entry in the truncation queue includes a physical on-disk offset associated with a different record of the plurality of records. The method includes determining to truncate the journal and truncating records, of the plurality of records, from the journal starting from a beginning record in the journal up to the record with the physical on-disk offset associated a least recent entry of the one or more entries in the truncation queue, where the truncating includes removing the records from the memory.

20 Claims, 9 Drawing Sheets

EFFICIENT INCREMENTAL JOURNAL TRUNCATION POLICY

BACKGROUND

In the field of data storage, a storage area network (SAN) is a dedicated, independent high-speed network that interconnects and delivers shared pools of storage devices to multiple servers. A virtual SAN (VSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The VSAN architecture may be a two-tier datastore including a performance tier for the purpose of read caching and write buffering and a capacity tier for persistent storage.

The VSAN datastore may manage storage of virtual disks at a block granularity. For example, VSAN may be divided into a number of physical blocks (e.g., 4096 bytes or "4K" size blocks), each physical block having a corresponding physical block address (PBA) that indexes the physical block in storage. Physical blocks of the VSAN may be used to store blocks of data (also referred to as data blocks) used by VMs, which may be referenced by logical block addresses (LBAs). Each block of data may have an uncompressed size corresponding to a physical block. Blocks of data may be stored as compressed data or uncompressed data in the VSAN, such that there may or may not be a one to one correspondence between a physical block in VSAN and a data block referenced by an LBA.

Modern storage platforms, including the VSAN datastore, may enable snapshot features for backup, archival, or data protections purposes. Snapshots provide the ability to capture a point-in-time state and data of a VM to not only allow data to be recovered in the event of failure but restored to known working points. Snapshots may not be stored as physical copies of all data blocks, but rather may entirely, or in part, be stored as pointers to the data blocks that existed when the snapshot was created.

Each snapshot may include its own snapshot metadata, e.g., mapping of LBAs mapped to PBAs, stored concurrently by several compute nodes (e.g., metadata servers). The snapshot metadata may be stored as key-value data structures to allow for scalable input/output (I/O) operations. In particular, a unified logical map B+ tree may be used to manage logical extents for the logical address to physical address mapping of each snapshot, where an extent is a specific number of contiguous data blocks allocated for storing information. A B+ tree is a multi-level data structure having a plurality of nodes, each node containing one or more key-value pairs stored as tuples (e.g., <key, value>). A key is an identifier of data and a value is either the data itself or a pointer to a location (e.g., in memory or on disk) of the data associated with the identifier.

In certain embodiments, the logical map B+ tree may be a copy-on-write (COW) B+ tree (also referred to as an append-only B+ tree). COW techniques improve performance and provide time and space efficient snapshot creation by only copying metadata about where the original data is stored, as opposed to creating a physical copy of the data, when a snapshot is created. Accordingly, when a COW approach is taken and a new child snapshot is to be created, instead of copying the entire logical map B+ tree of the parent snapshot, the child snapshot shares with the parent and, in some cases, ancestor snapshots, one or more extents by having a B+ tree index node, exclusively owned by the child, point to shared parent and/or ancestor B+ tree nodes. Updates to the logical map COW B+ tree can be recorded in a write-ahead-log (WAL). The changes to the logical map COW B+ tree may be kept in memory until they are persisted to storage. Once a COW B+ tree operation is persisted to storage, the corresponding record may be removed from the WAL.

The WAL is one example of a journal that contains metadata that logs events, such as changes (e.g., adding, removing, or changing pages) to a data structure. A journal may also be referred to as a transaction log. Removal of records from the journal may be referred to as journal truncation. Journal truncation frees cache space for accepting new journal records. Truncation of the entire journal may significantly slow down foreground I/Os. To minimize the impact of journal truncation, only a portion of the journal may be truncated.

Accordingly, there is a need in the art for improved techniques for efficient journal truncation.

It should be noted that the information included in the Background section herein is simply meant to provide a reference for the discussion of certain embodiments in the Detailed Description. None of the information included in this Background should be considered as an admission of prior art.

DETAILED DESCRIPTION

Figure 1:
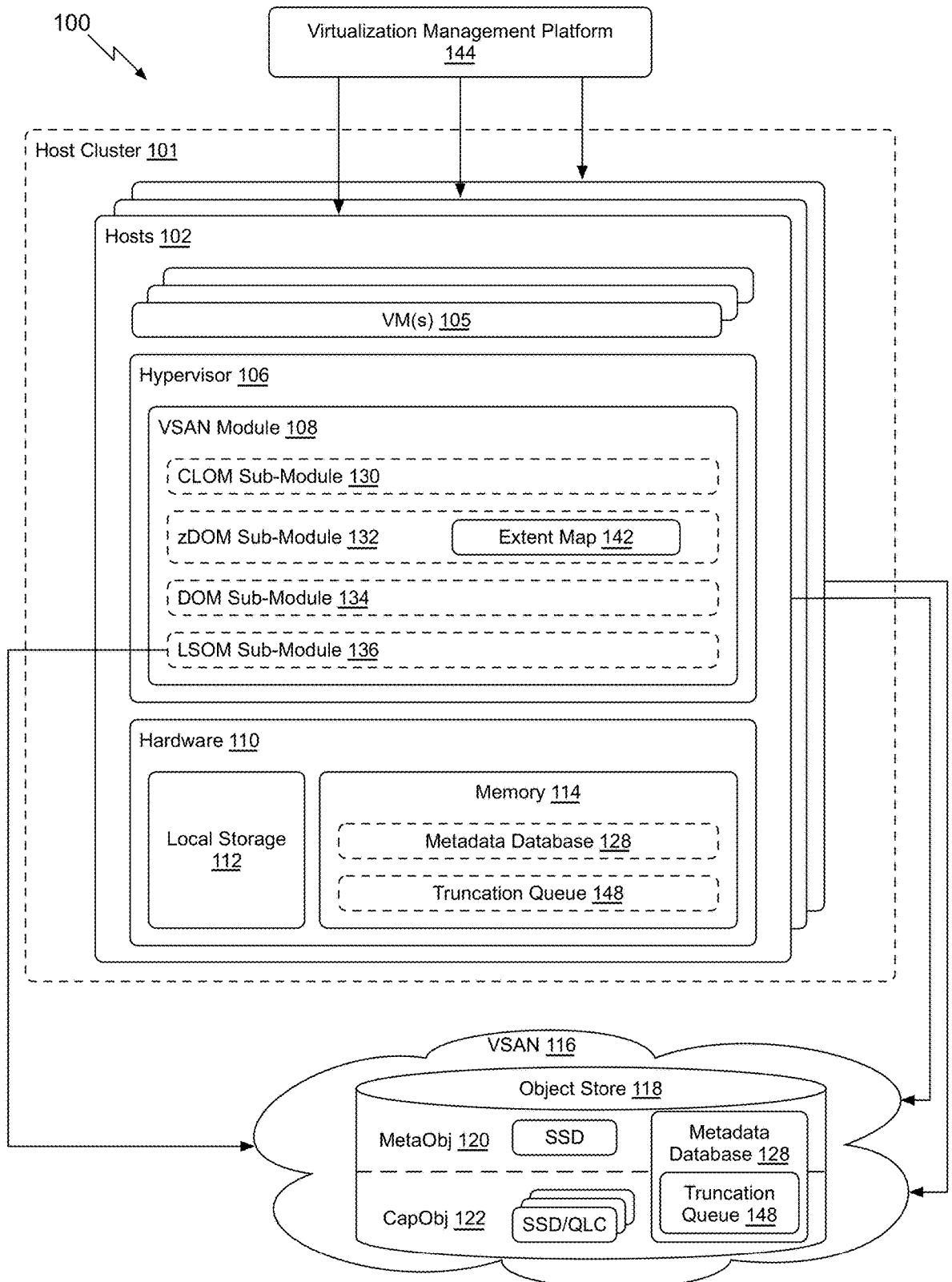
FIG. 1 is a diagram illustrating an example computing environment in which embodiments of the present application may be practiced.

Aspects of the present disclosure introduce techniques for efficient B+ tree journal truncation.

In some embodiments, in addition to the journal, the system maintains an incremental truncation queue, as described in more detail below with respect to FIGS. 5-9. Each entry in the incremental truncation queue contains a physical on-disk offset. The on-disk offset indicates a location of the data on the disk. In some embodiments, each entry in the incremental truncation queue also contains a log sequence number (LSN) associated with an event. The event may indicate a change to a data structure, such as to a B+ tree.

In some embodiments, the journal is divided into portions. For example, each portion may have a size that is a divisor of the total size of the journal. The portion size may be preconfigured. Accordingly, when records are added to the journal and the portion size is reached, an entry is added to the incremental truncation queue. The entry added to the incremental truncation queue contains the physical offset of the last record in the portion (and, optionally, the LSN of that record). In some embodiments, the system maintains a current physical offset, $m_{current}$. The current physical offset may be the physical offset of the latest FlushedLSN. For example, a transaction buffer may contain LSNs to be committed and, when the transaction buffer is flushed, the physical offset of the largest LSN of the flushed LSNs is considered as a candidate for entry to the incremental truncation queue. Thus, the FlushedLSN is largest LSN that has been flushed from the buffer so far. The FlushedLSN is updated every time a WAL buffer is written to the disk.

In some embodiments, the system determines when the sum of the size of the records being flushed to the journal (e.g., logsToBeFlushedSize) and the difference between the current physical offset, $m_{current}$, and the physical offset of the latest entry in the incremental truncation queue, $m_i$, reaches a threshold, $\Delta_{thresh}$. That is, the system determines whether $[\text{logsToBeFlushedSize}+(m_{current}-m_i)] \geq \Delta_{thresh}$, where $\Delta_{thresh}$ is the preconfigured portion size. If so, then the portion size is reached and the physical offset of logsToBeFlushedSize+$(m_{current}-m_i)$ is added (e.g., along with the LSN of the FlushedLSN) to the incremental truncation queue and becomes the new $m_{current}$. In this case, when a next flush occurs, the system determines whether to add the physical offset (and the LSN) of the new FlushedLSN to the incremental truncation queue, $m_{current}=m_i$. When $[\text{logsToBeFlushedSize}+(m_{current}-m_i)] < \Delta_{thresh}$, then the physical offset of logsToBeFlushedSize+$(m_{current}-m_i)$ is not added (nor is the LSN of the FlushedLSN), and the incremental truncation queue becomes the new $m_{current}$. In this case, when the next flush occurs and the system determines whether to add the physical offset of logsToBeFlushedSize+$(m_{current}-m_i)$ to the incremental truncation queue (e.g., along with the LSN of the new FlushedLSN), $m_{current}=m_{PreviousFlushedLSN}$. In an illustrative example, a journal size is 120 kilobytes (KB) and $\Delta_{thresh}$ is 12 KB. In this example, the journal is partitioned into 12 KB portions that are each increments of ten percent (10%) of the journal size.

In some embodiments, the incremental truncation queue is used during truncation. In some embodiments, the journal is truncated when the journal is full, becomes larger than a threshold size, periodically, or upon occurrence of an event or trigger. In some embodiments, when the journal truncation is performed, the journal may be truncated up to the physical offset (or records up to the LSN) of the first, least recent, entry in the incremental truncation queue. That entry is then dequeued—removed from the incremental truncation queue. Accordingly, where $m_0$ is the physical offset of the beginning of the journal and $m_1$ is the physical offset of the first entry in the incremental truncation queue, the amount of space freed in the journal is $m_1-m_0$ (or modulo LOG SIZE in case of wrap around).

Though certain aspects described herein are described with respect to the WAL and B+ trees, the aspects may be applicable to any suitable metadata journal associated with any ordered data structure.

FIG. 1 is a diagram illustrating an example computing environment 100 in which embodiments may be practiced. As shown, computing environment 100 may include a distributed object-based datastore, such as a software-based "virtual storage area network" (VSAN) environment, VSAN 116, that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of VSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, VSAN 116 is configured to store virtual disks of VMs 105 as data blocks in a number of physical blocks, each physical block having a PBA that indexes the physical block in storage. VSAN module 108 may create an "object" for a specified data block by backing it with physical storage resources of an object store 118 (e.g., based on a defined policy).

VSAN 116 may be a two-tier datastore, storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data.

Each host 102 may include a storage management module (referred to herein as a VSAN module 108) in order to automate storage management workflows (e.g., create objects in MetaObj 120 and CapObj 122 of VSAN 116, etc.) and provide access to objects (e.g., handle I/O operations to objects in MetaObj 120 and CapObj 122 of VSAN 116, etc.) based on predefined storage policies specified for objects in object store 118.

A virtualization management platform 144 is associated with host cluster 101. Virtualization management platform 144 enables an administrator to manage the configuration and spawning of VMs 105 on various hosts 102. As illustrated in FIG. 1, each host 102 includes a virtualization layer or hypervisor 106, a VSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Each hypervisor 106, through its corresponding VSAN module 108, provides access to storage resources located in hardware 110 (e.g., storage) for use as storage for virtual disks (or portions thereof) and other related files that may be accessed by any VM 105 residing in any of hosts 102 in host cluster 101.

VSAN module 108 may be implemented as a "VSAN" device driver within hypervisor 106. In such an embodiment, VSAN module 108 may provide access to a conceptual "VSAN" through which an administrator can create a number of top-level "device" or namespace objects that are backed by object store 118 of VSAN 116. By accessing application programming interfaces (APIs) exposed by VSAN module 108, hypervisor 106 may determine all the top-level file system objects (or other types of top-level device objects) currently residing in VSAN 116.

Each VSAN module 108 (through a cluster level object management or "CLOM" sub-module 130) may communicate with other VSAN modules 108 of other hosts 102 to create and maintain an in-memory metadata database 128 (e.g., maintained separately but in synchronized fashion in memory 114 of each host 102) that may contain metadata describing the locations, configurations, policies and relationships among the various objects stored in VSAN 116. Specifically, in-memory metadata database 128 may serve as a directory service that maintains a physical inventory of VSAN 116 environment, such as the various hosts 102, the storage resources in hosts 102 (e.g., SSD, NVMe drives, magnetic disks, etc.) housed therein, and the characteristics/capabilities thereof, the current state of hosts 102 and their corresponding storage resources, network paths among hosts 102, and the like. In-memory metadata database 128 may further provide a catalog of metadata for objects stored in MetaObj 120 and CapObj 122 of VSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by VSAN module 108 on host 102, for example, when a user (e.g., an administrator) first creates a virtual disk for VM 105 as well as when VM 105 is running and performing I/O operations (e.g., read or write) on the virtual disk.

VSAN module 108, by querying its local copy of in-memory metadata database 128, may be able to identify a particular file system object (e.g., a virtual machine file system (VMFS) file system object) stored in object store 118 that may store a descriptor file for the virtual disk. The descriptor file may include a reference to a virtual disk object that is separately stored in object store 118 of VSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by VSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host 102.

In some embodiments, VSAN module 108 is configured to maintain an incremental truncation queue 148, as described in more detail below with respect to FIGS. 5-9. In some embodiments, VSAN module 108 is configured to truncate the journal (e.g., WAL) according to the incremental truncation queue 148, as described in more detail below with respect to FIGS. 5-9.

Various sub-modules of VSAN module 108, including, in some embodiments, CLOM sub-module 130, distributed object manager (DOM) sub-module 134, zDOM sub-module 132, and/or local storage object manager (LSOM) sub-module 136, handle different responsibilities. CLOM sub-module 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in object store 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. The storage policy may define attributes such as a failure tolerance, which defines the number of host and device failures that a VM can tolerate. A redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of VSAN 116 datastore. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). Including RAID 5 and RAID 6 configurations, each stripe may also include one or more parity blocks. Accordingly, CLOM sub-module 130, may be responsible for generating a virtual disk blueprint describing a RAID configuration.

CLOM sub-module 130 may communicate the blueprint to its corresponding DOM sub-module 134, for example, through zDOM sub-module 132. DOM sub-module 134 may interact with objects in VSAN 116 to implement the blueprint by allocating or otherwise mapping component objects of the virtual disk object to physical storage locations within various hosts 102 of host cluster 101. DOM sub-module 134 may also access in-memory metadata database 128 to determine the hosts 102 that store the component objects of a corresponding virtual disk object and the paths by which those hosts 102 are reachable in order to satisfy the I/O operation. Some or all of metadata database 128 (e.g., the mapping of the object to physical storage locations, etc.) may be stored with the virtual disk object in object store 118.

When handling an I/O operation from VM 105, due to the hierarchical nature of virtual disk objects in certain embodiments, DOM sub-module 134 may further communicate across the network (e.g., a local area network (LAN), or a wide area network (WAN)) with a different DOM sub-module 134 in a second host 102 (or hosts 102) that serves as the coordinator for the particular virtual disk object that is stored in local storage 112 of the second host 102 (or hosts 102) and which is the portion of the virtual disk that is subject to the I/O operation. If VM 105 issuing the I/O operation resides on a host 102 that is also different from the coordinator of the virtual disk object, DOM sub-module 134 of host 102 running VM 105 may also communicate across the network (e.g., LAN or WAN) with the DOM sub-module 134 of the coordinator. DOM sub-modules 134 may also similarly communicate amongst one another during object creation (and/or modification).

Each DOM sub-module 134 may create their respective objects, allocate local storage 112 to such objects, and advertise their objects in order to update in-memory metadata database 128 with metadata regarding the object. In order to perform such operations, DOM sub-module 134 may interact with a local storage object manager (LSOM) sub-module 136 that serves as the component in VSAN module 108 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested.

zDOM sub-module 132 may be responsible for caching received data in the performance tier of VSAN 116 (e.g., as a virtual disk object in MetaObj 120) and writing the cached data as full stripes on one or more disks (e.g., as virtual disk objects in CapObj 122). To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance. For example, zDOM sub-module 132 may do this full stripe writing to minimize a write amplification effect. Write amplification, refers to the phenomenon that occurs in, for example, SSDs, in which the amount of data written to the memory device is greater than the amount of information requested to be stored by host 102. Write amplification may differ in different types of writes. Lower write amplification may increase performance and lifespan of an SSD.

In some embodiments, zDOM sub-module 132 performs other datastore procedures, such as data compression and hash calculation, which may result in substantial improvements, for example, in garbage collection, deduplication, snapshotting, etc. (some of which may be performed locally by LSOM sub-module 136).

In some embodiments, zDOM sub-module 132 stores and accesses an extent map 142. Extent map 142 provides a mapping of logical block addresses (LBAs) to physical block addresses (PBAs), or LBAs to middle block addresses (MBAs) to PBAs. Each physical block having a corresponding PBA may be referenced by one or more LBAs.

In certain embodiments, for each LBA, VSAN module 108, may store in a logical map of extent map 142, at least a corresponding PBA. The logical map may include an LBA to PBA mapping table. For example, the logical map may store tuples of <LBA, PBA>, where the LBA is the key and the PBA is the value. As used herein, a key is an identifier of data and a value is either the data itself or a pointer to a location (e.g., on disk) of the data associated with the identifier. In some embodiments, the logical map further includes a number of corresponding data blocks stored at a physical address that starts from the PBA (e.g., tuples of <LBA, PBA, number of blocks>, where LBA is the key). In some embodiments where the data blocks are compressed, the logical map further includes the size of each data block compressed in sectors and a compression size (e.g., tuples of <LBA, PBA, number of blocks, number of sectors, compression size>, where LBA is the key).

In certain other embodiments, for each LBA, VSAN module 108, may store in a logical map, at least a corresponding MBA, which further maps to a PBA in a middle map of extent map 142. In other words, extent map 142 may be a two-layer mapping architecture. A first map in the mapping architecture, e.g., the logical map, may include an LBA to MBA mapping table, while a second map, e.g., the middle map, may include an MBA to PBA mapping table. For example, the logical map may store tuples of <LBA, MBA>, where the LBA is the key and the MBA is the value, while the middle map may store tuples of <MBA, PBA>, where the MBA is the key and the PBA is the value. According to the information stored in the logical map, VSAN module 108 may use the logical map to determine which PBA is referenced by an LBA.

Logical maps may also be used in snapshot mapping architecture. Modern storage platforms, including VSAN 116, may enable snapshot features for backup, archival, or data protections purposes. Snapshots provide the ability to capture a point-in-time state and data of a VM 105 to not only allow data to be recovered in the event of failure but restored to known working points. Snapshots may capture VMs' 105 storage, memory, and other devices, such as virtual network interface cards (NICs), at a given point in time. Snapshots do not require an initial copy, as they are not stored as physical copies of data blocks (at least initially), but rather as pointers to the data blocks that existed when the snapshot was created. Because of this physical relationship, a snapshot may be maintained on the same storage array as the original data.

As mentioned, snapshots collected over two or more backup sessions may create a snapshot hierarchy where snapshots are connected in a branch tree structure with one or more branches. Snapshots in the hierarchy have parent-child relationships with one or more other snapshots in the hierarchy. In linear processes, each snapshot has one parent snapshot and one child snapshot, except for the last snapshot, which has no child snapshots. Each parent snapshot may have more than one child snapshot. Additional snapshots in the snapshot hierarchy may be created by reverting to the current parent snapshot or to any parent or child snapshot in the snapshot tree to create more snapshots from that snapshot. Each time a snapshot is created by reverting to any parent or child snapshot in the snapshot tree, a new branch in the branch tree structure is created.

Figure 2:
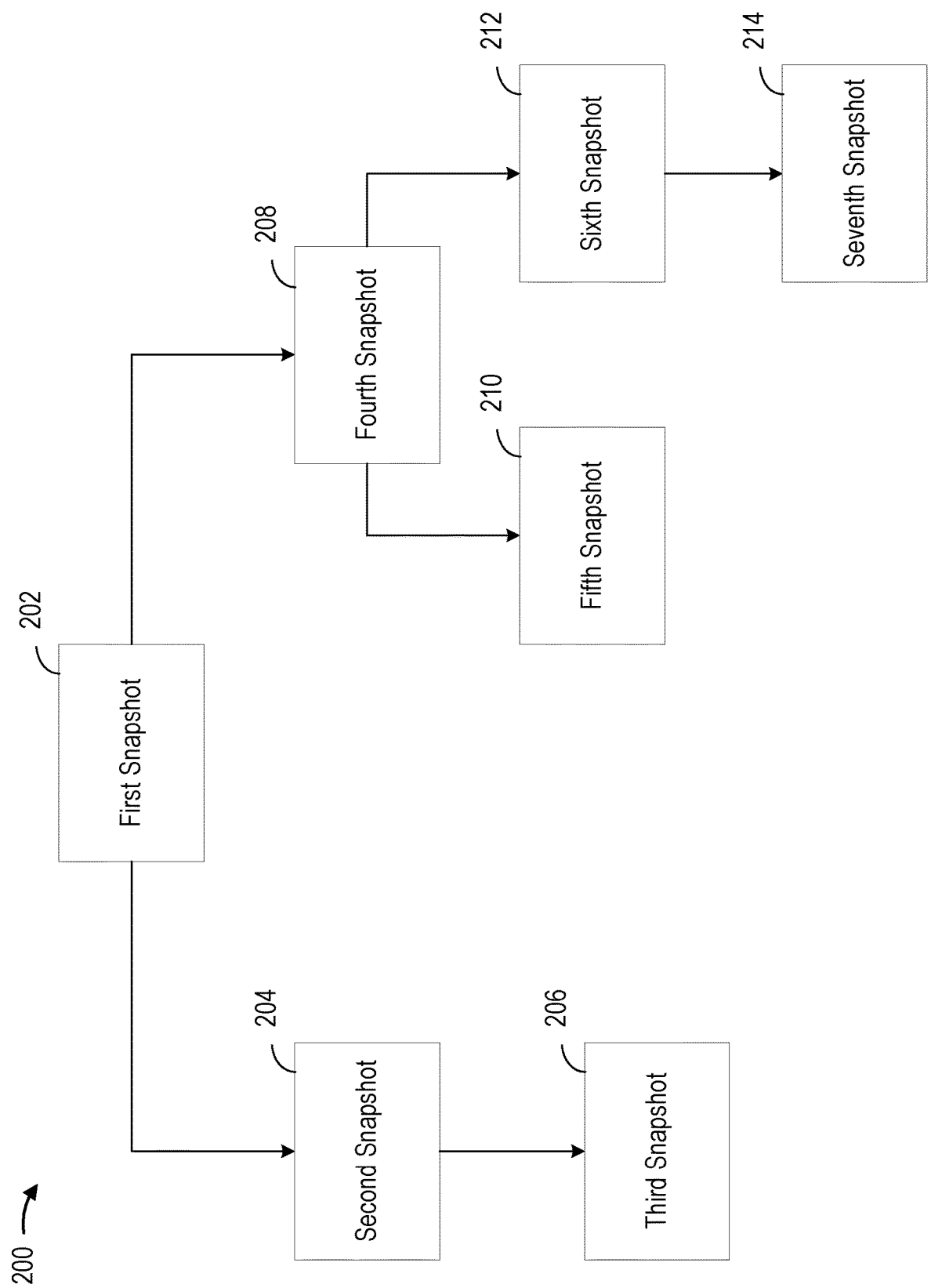
FIG. 2 is a block diagram illustrating an example snapshot hierarchy, according to an example embodiment of the present disclosure.

FIG. 2 is a block diagram illustrating an example snapshot hierarchy 200, according to an example embodiment of the present disclosure. As shown in FIG. 2, seven snapshots may exist in snapshot hierarchy 200. A first snapshot 202 may be a snapshot created first in time. First snapshot 202 may be referred to as a root snapshot of the snapshot hierarchy 200, as first snapshot 202 does not have any parent snapshots. First snapshot 202 may further have two child snapshots: second snapshot 204 and fourth snapshot 208. Fourth snapshot 208 may have been created after reverting back to first snapshot 202 in snapshot hierarchy 200, thereby creating an additional branch from first snapshot 202 to fourth snapshot 208. Second snapshot 204 and fourth snapshot 208 may be considered sibling snapshots. Second snapshot 204 and fourth snapshot 208 are only child snapshots of first snapshot 202 but also parent snapshots of other snapshots in snapshot hierarchy 200. In particular, second snapshot 204 is a parent of third snapshot 206, and fourth snapshot 208 is a parent of both fifth snapshot 210 and sixth snapshot 212. Third snapshot 206, fifth snapshot 210, and sixth snapshot 212 may be considered grandchildren snapshots of first snapshot 202. Third snapshot 206 and fifth snapshot 210 may not have any children snapshots; however, sixth snapshot 212 has a child snapshot, seventh snapshot 214. Seventh snapshot 214 may not have any children snapshots in snapshot hierarchy 200.

While FIG. 2 illustrates only seven snapshots in snapshot hierarchy 200, any number of snapshots may be considered as part of a snapshot hierarchy. Further, any parent-child relationships between the snapshots in the snapshot hierarchy may exist in addition to, or alternative to, the parent-child relationships illustrated in FIG. 2.

Figure 3:
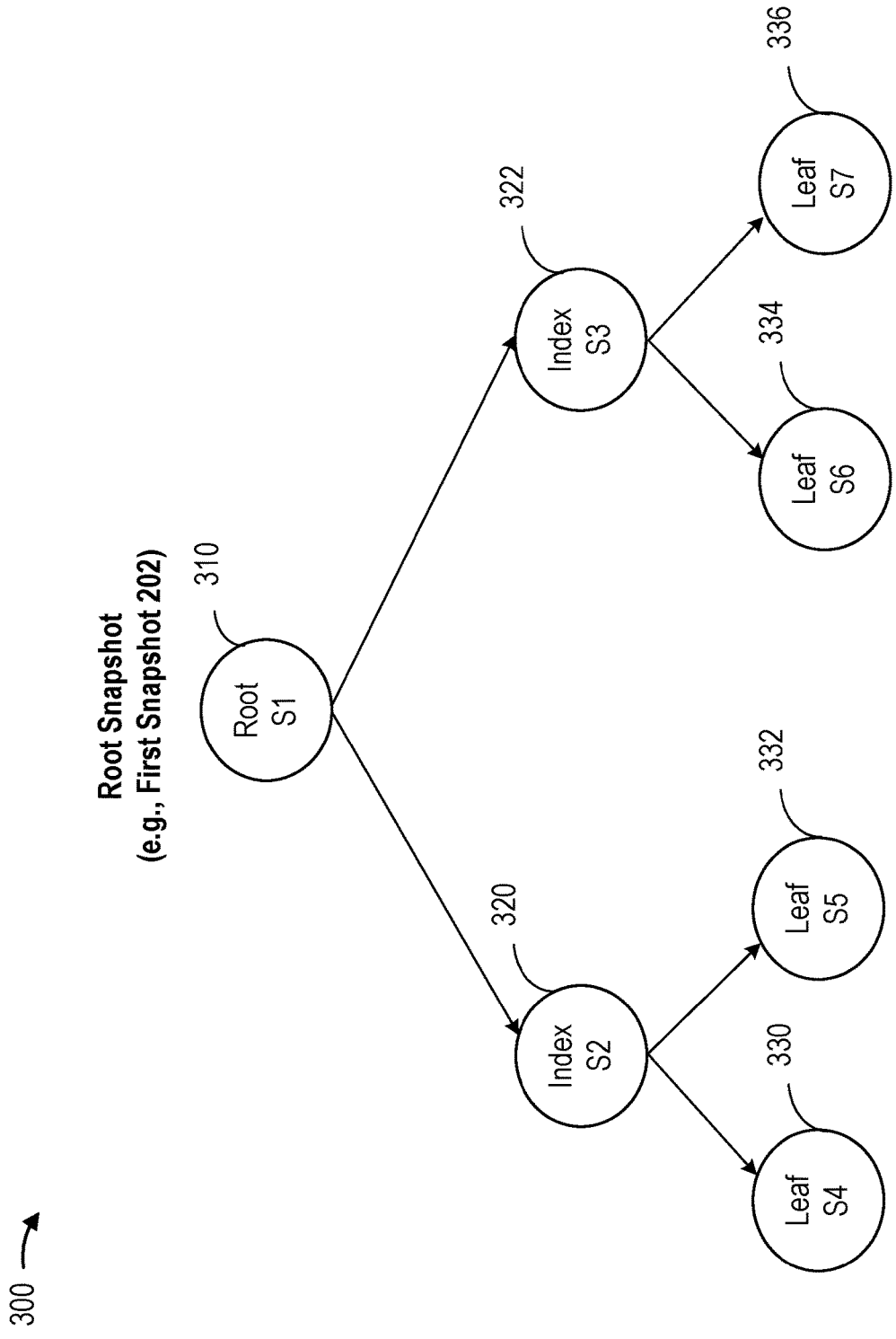
FIG. 3 is a block diagram illustrating a B+ tree data structure, according to an example embodiment of the present disclosure.

Each snapshot in the snapshot hierarchy may include its own logical map. In certain embodiments, the logical maps of the snapshots are stored as a B+ tree. FIG. 3 is a block diagram illustrating a B+ tree 300 data structure, according to an example embodiment of the present application. For illustrative purposes, B+ tree 300 may represent the logical map for the root snapshot (e.g., first snapshot 202) in snapshot hierarchy 200.

As illustrated, B+ tree 300 may include a plurality of nodes connected in a branching tree structure. The top node of a B+ tree may be referred as a root node, e.g., root node 310, which has no parent node. The middle level of B+ tree 300 may include index nodes 320 and 322 (also referred to as "index" nodes), which may have both a parent node and one or more child nodes. In the illustrated example, B+ tree 300 has three levels (e.g., level 0, level 1, and level 2), and only a single middle level (e.g., level 1), but other B+ trees may have a greater number of levels with more middle levels and thus greater heights. The bottom level of B+ tree 300 may include leaf nodes 330-336 which do not have any more children nodes. In the illustrated example, in total, B+ tree 300 has seven nodes and three levels. Root node 310 is in level two of the tree, middle (or index) nodes 320 and 322 are in level one of the tree, and leaf nodes 330-336 are in level zero of the tree.

Each node of B+ tree 300 may store at least one tuple. In a B+ tree, leaf nodes may contain data values (or real data) and middle (or index) nodes may contain only indexing keys. For example, each of leaf nodes 330-336 may store at least one tuple that includes a key mapped to real data, or mapped to a pointer to real data, for example, stored in a memory or disk. As shown in FIG. 3, these tuples may correspond to key-value pairs of <LBA, MBA> or <LBA, PBA> mappings for data blocks associated with each LBA. In some embodiments, each leaf node may also include a pointer to its sibling(s), which is not shown for simplicity of description. On the other hand, a tuple in the middle and/or root nodes of B+ tree 300 may store an indexing key and one or more pointers to its child node(s), which can be used to locate a given tuple that is stored in a child node.

Because B+ tree 300 contains sorted tuples, a read operation such as a scan or a query to B+ tree 300 may be completed by traversing the B+ tree relatively quickly to read the desired tuple, or the desired range of tuples, based on the corresponding key or starting key.

According to aspects described herein, each node of B+ tree 300 may be assigned a monotonically increasing sequence number (SN). For example, a node with a higher SN may be a node which was created later in time than a node with a smaller SN. As shown in FIG. 3, root node 310 may be assigned an SN of S1 as root node 310 belongs to the root snapshot (e.g., first snapshot 202 illustrated in FIG. 2, created first in time) and was the first node created for the root snapshot. Other nodes of B+ tree 300 may similarly be assigned an SN, for example, node 320 may be assigned S2, index node 322 may be assigned S3, leaf node 330 may be assigned S4, and so forth. As described in more detail below, the SNs assigned to each node in the B+ tree snapshot may be used during snapshot deletion to verify nodes that are exclusively owned by the snapshot or that are shared with a parent snapshot.

In certain embodiments, the B+ tree logical map for each child snapshot in a snapshot hierarchy may be a COW B+ tree (also referred to as an append-only B+ tree). When a COW approach is taken and a child snapshot is created, instead of copying the entire B+ tree logical map of the parent snapshot, the child snapshot shares with the parent and, in some cases, ancestor snapshots, one or more extents by having a B+ tree index node, exclusively owned by the child, point to shared parent and/or ancestor B+ tree nodes. This COW approach for the creation of a child B+ tree logical map may be referred to as a "lazy copy approach" as the entire B+ tree logical map of the parent snapshot is not copied when creating the child B+ tree logical map.

Figure 4:
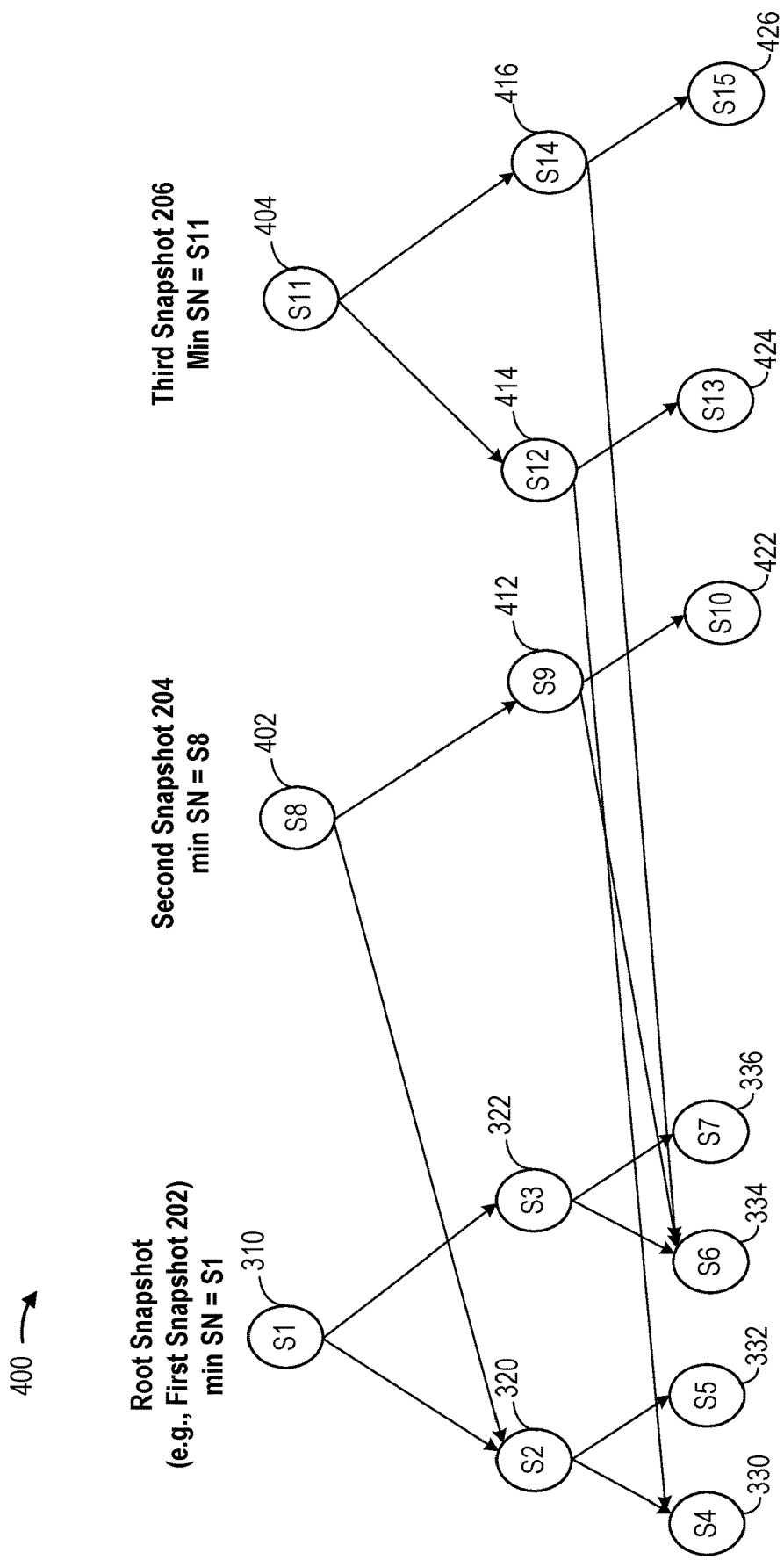
FIG. 4 is a block diagram illustrating a B+ tree data structure using a copy-on-write (COW) approach for the creation of logical map B+ trees for child snapshots in a snapshot hierarchy, according to an example embodiment of the present application

FIG. 4 is a block diagram illustrating a B+ tree data structure 400 using a COW approach for the creation of B+ tree logical maps for child snapshots in a snapshot hierarchy, according to an example embodiment of the present application. For illustrative purposes, B+ tree data structure 400 may represent the B+ tree logical maps for first snapshot 202, second snapshot 204, and third snapshot 206 in snapshot hierarchy 200. Fourth snapshot 208, fifth snapshot 210, sixth snapshot 212, and seventh snapshot 214 have been removed from the illustration of FIG. 4 for simplicity. However, B+ tree logical maps for fourth snapshot 208, fifth snapshot 210, sixth snapshot 212, and seventh snapshot 214 may exist in a similar manner as B+ tree logical maps described for first snapshot 202, second snapshot 204, and third snapshot 206 in FIG. 4.

As shown in FIG. 4, index node 320 and leaf node 334 are shared by root node 310 of a first B+ tree logical map (e.g., associated with first snapshot 202) and root node 402 of a second B+ tree logical map (e.g., associated with second snapshot 204, which is a child snapshot of first snapshot 202) generated from the first B+ tree logical map. This way, the two root nodes 310 and 402 may share the data of the tree without having to duplicate the entire data of the tree.

More specifically, when the B+ tree logical map for second snapshot 204 was created, the B+ tree logical map for first snapshot 202 was copied and snapshot data for leaf node 336 was overwritten, while leaf nodes 330, 332, and 334 were unchanged. Accordingly, root node 402 in the B+ tree logical map for second snapshot 204 has a pointer to node 320 in the B+ tree logical map for first snapshot 202 for the shared nodes 320, 330, and 332, but, instead of root node 402 having a pointer to index node 322, index node 412 was created with a pointer to shared leaf node 334 (e.g., shared between first snapshot 202 and second snapshot 204) and a pointer to new leaf node 422, containing metadata for the overwritten data block. Similar methods may be used to create the B+ tree logical map for third snapshot 206 illustrated in FIG. 4.

As mentioned, each node of each B+ tree logical map in B+ tree data structure 400 may be assigned a monotonically increasing SN for purposes of checking the metadata consistency of snapshots in B+ tree data structure 400, and more specifically, in snapshot hierarchy 200. Further, the B+ tree logical map for each snapshot in B+ tree data structure 400 may be assigned a min SN, where the min SN is equal to a smallest SN value among all nodes owned by the snapshot. For example, in the example B+ tree data structure 400, first snapshot 202 may own nodes S1-S7; thus, the min SN assigned to the B+ tree logical map of first snapshot 202 may be equal to S1. Similarly, second snapshot 204 may own nodes S8-S10; thus, the min SN of the B+ tree logical map of second snapshot 204 may be equal to S8, and third snapshot 206 may own node S11-S15; thus, the min SN of the B+ tree logical map of third snapshot 206 may be equal to S11.

Accordingly, each node in the B+ tree logical map of child snapshots 204 and 206 whose SN is smaller than the min SN assigned to the B+ tree logical map of the snapshot may be a node that is not owned by the snapshot, but instead shared with an ancestor snapshot. For example, when traversing through the B+ tree logical map of second snapshot 204, node 320 may be reached. Because node 320 is associated with an SN less than the min SN of second snapshot 204 (e.g., S2<S8), node 320 may be determined to be a node that is not owned by second snapshot 204, but instead owned by first snapshot 202 and shared with second snapshot 204. On the other hand, each node in the B+ tree logical maps of child snapshots 204 and 206 whose SN is larger than the min SN assigned to the snapshot may be a node that is owned by the snapshot. For example, when traversing through the B+ tree logical map of second snapshot 204, node 412 may be reached. Because node 412 is associated with an SN greater than the min SN of second snapshot 204 (e.g., S9>S8), node 412 may be determined to be a node that is owned by second snapshot 204. Such rules may be true for all nodes belonging to each of the snapshot B+ tree logical maps created for a snapshot hierarchy, such as snapshot hierarchy 200 illustrated in FIG. 2.

Figure 5:
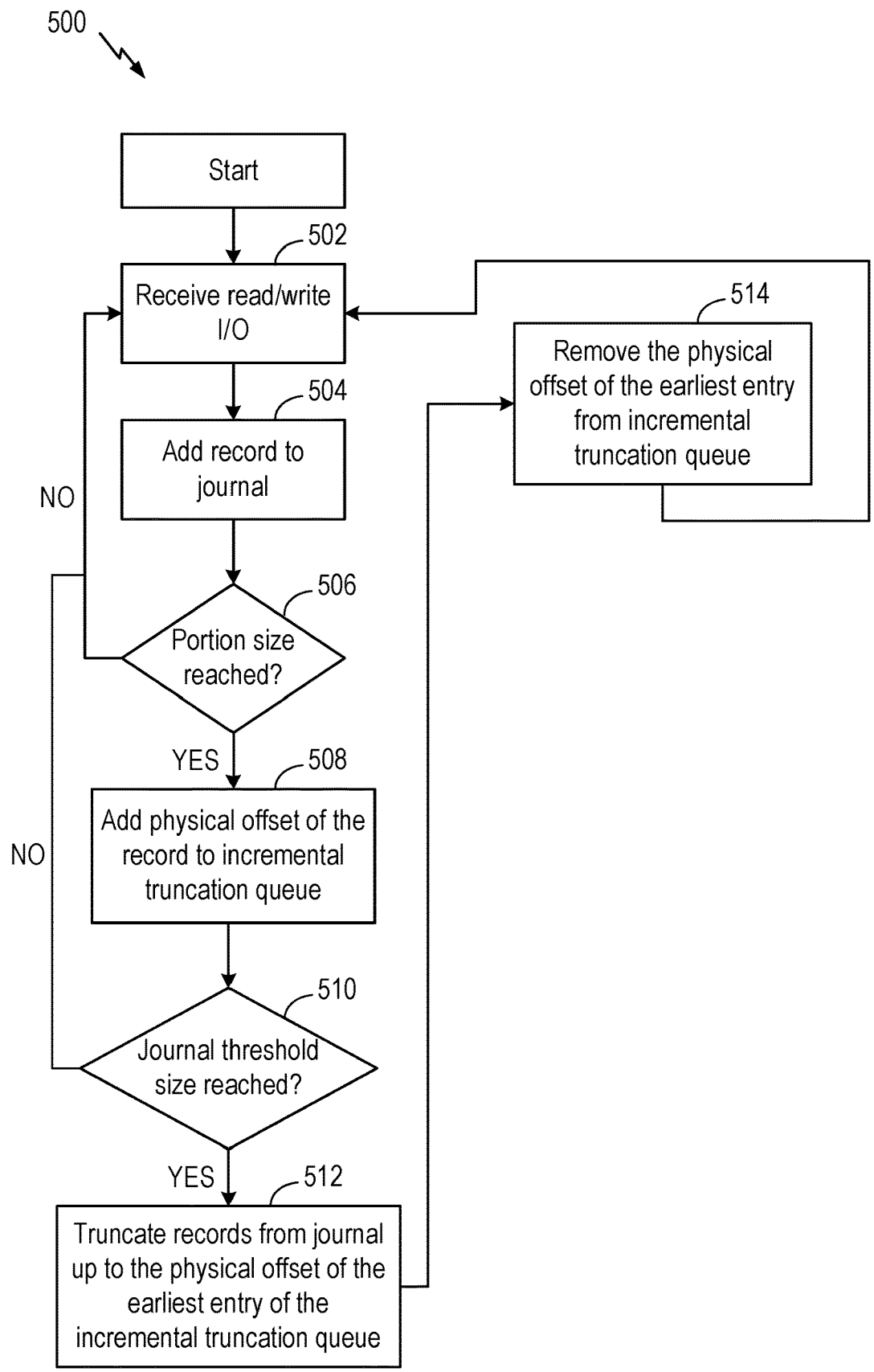
FIG. 5 is an example workflow for efficient journal truncation, according to an example embodiment of the present disclosure.

FIG. 5 is an example workflow 500 for efficient journal truncation, according to an example embodiment of the present disclosure. Workflow 500 may be performed by VSAN module 108, and in some cases, zDOM sub-module 132, illustrated in FIG. 1. Operations of workflow 500 may be described with respect to example snapshot hierarchy 200 of FIG. 2 and B+ tree 300 illustrated in FIG. 3 and with respect to the journal and incremental truncation queue of FIGS. 6-9.

Workflow 500 may begin, at operation 502, by VSAN module 108 by receiving a read or write I/O. In some embodiments, a number of I/Os are buffered before being committed and flushed. The I/Os may be associated with an LSN. As discussed above, a batch of LSNs that are committed may be associated with a FlushedLSN that is the largest LSN of the batch.

At operation 504, the flushed LSNs are added to the journal. For example, a record may be added in the journal for each flushed LSN. As discussed herein, the journal may be a WAL for a COW B+ tree or other transaction log that records changes to a data structure. The description of FIG. 5 continues below, with reference to FIGS. 6-9.

Figure 6:
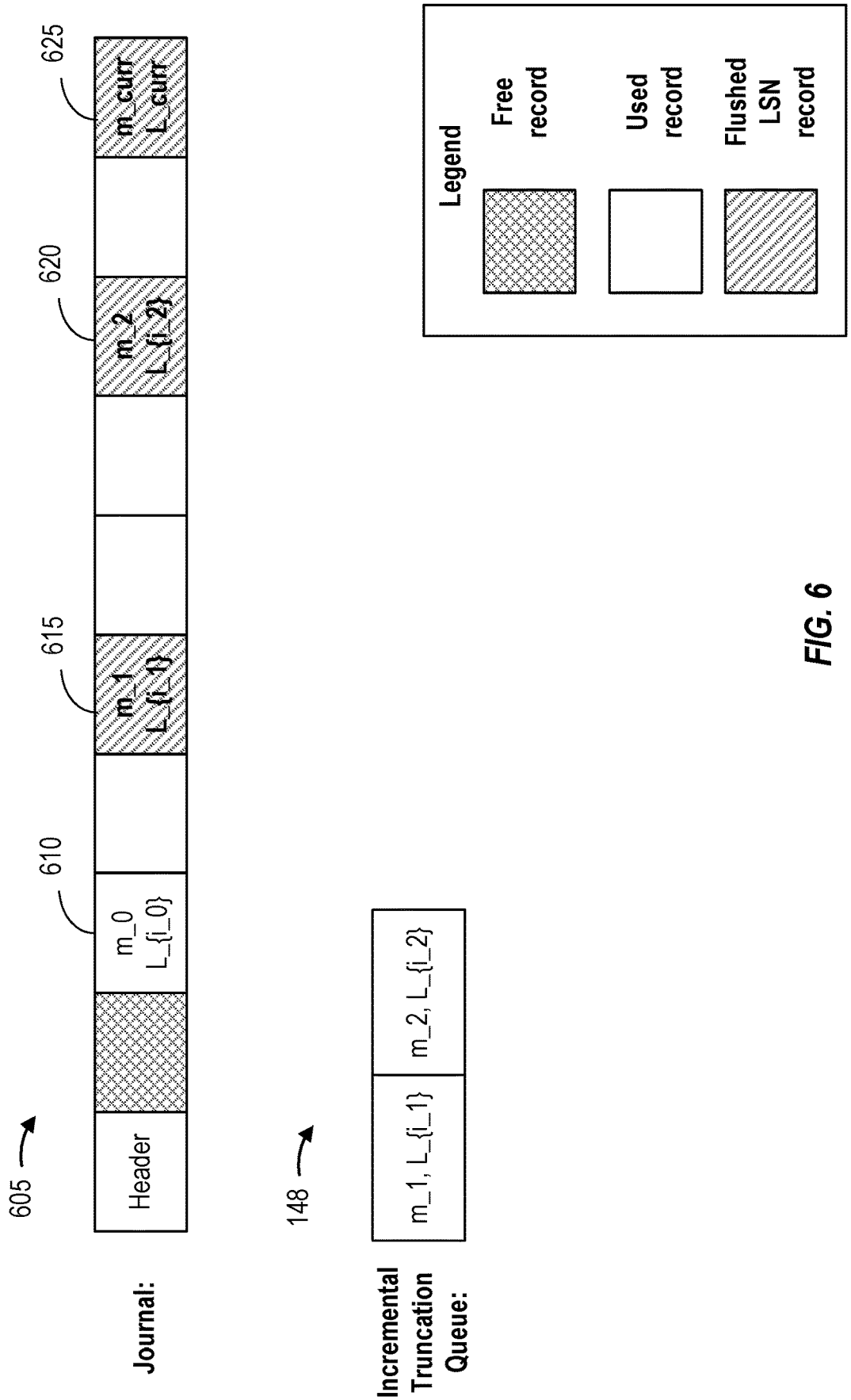
FIG. 6 is an example journal and incremental truncation queue, according to an example embodiment of the present disclosure.

FIG. 6 illustrates an example journal 605 and incremental truncation queue 148, according to an example embodiment of the present disclosure. As shown, the journal may include a header. The physical on-disk offset to the beginning of the journal 605—that is, to the first used record 610, is denoted $m_0$. The LSN of the record at the beginning of the journal is denoted by $L_{i\_0}$ and may be referred to as the headLSN. Each record may be associated with an event affecting a page. For example, each record in journal 605 associated with a physical on-disk offset and LSN may be associated with addition, deletion, or modification of a page. In some embodiments, the record indicates addition, deletions, or changes to nodes in the COW B+ tree as illustrated in FIGS. 2-4.

As discussed above, in addition to the journal 605, the system maintains an incremental truncation queue 148. Each entry in the incremental truncation queue 148 contains a physical on-disk offset of one of the records in journal 605. In some embodiments, each entry in the incremental truncation queue 148 also contains a LSN. As shown in FIG. 6, the incremental truncation queue 148 includes a first entry associated with a first record 615 in journal 605 ($m_1$, $L_{i\_1}$) and a second entry associated with a second record 620 in journal 605 ($m_2$, $L_{i\_2}$). The amount of journal space between the first record and the second record in journal 605 is equal to or greater than a threshold size, $\Delta_{threshold}$. In some embodiments, the threshold size is preconfigured. In some embodiments, the threshold size is a divisor of the journal size and partitions the journal 605 into incremental portions.

The threshold size can be used to determine whether to add a record in journal 605 to incremental truncation queue 148. At 506, the system determines whether a portion size is reached. In some embodiments, the system maintains a current physical offset, $m_{current}$. The current physical offset is the physical offset of the most recent record added to the journal 605. As shown in FIG. 6, the physical offset of the last record 625 in journal 605 is the current physical offset ($m_{curr}$) and the LSN of the last record 625 is the current LSN ($L_{curr}$).

Figure 7:
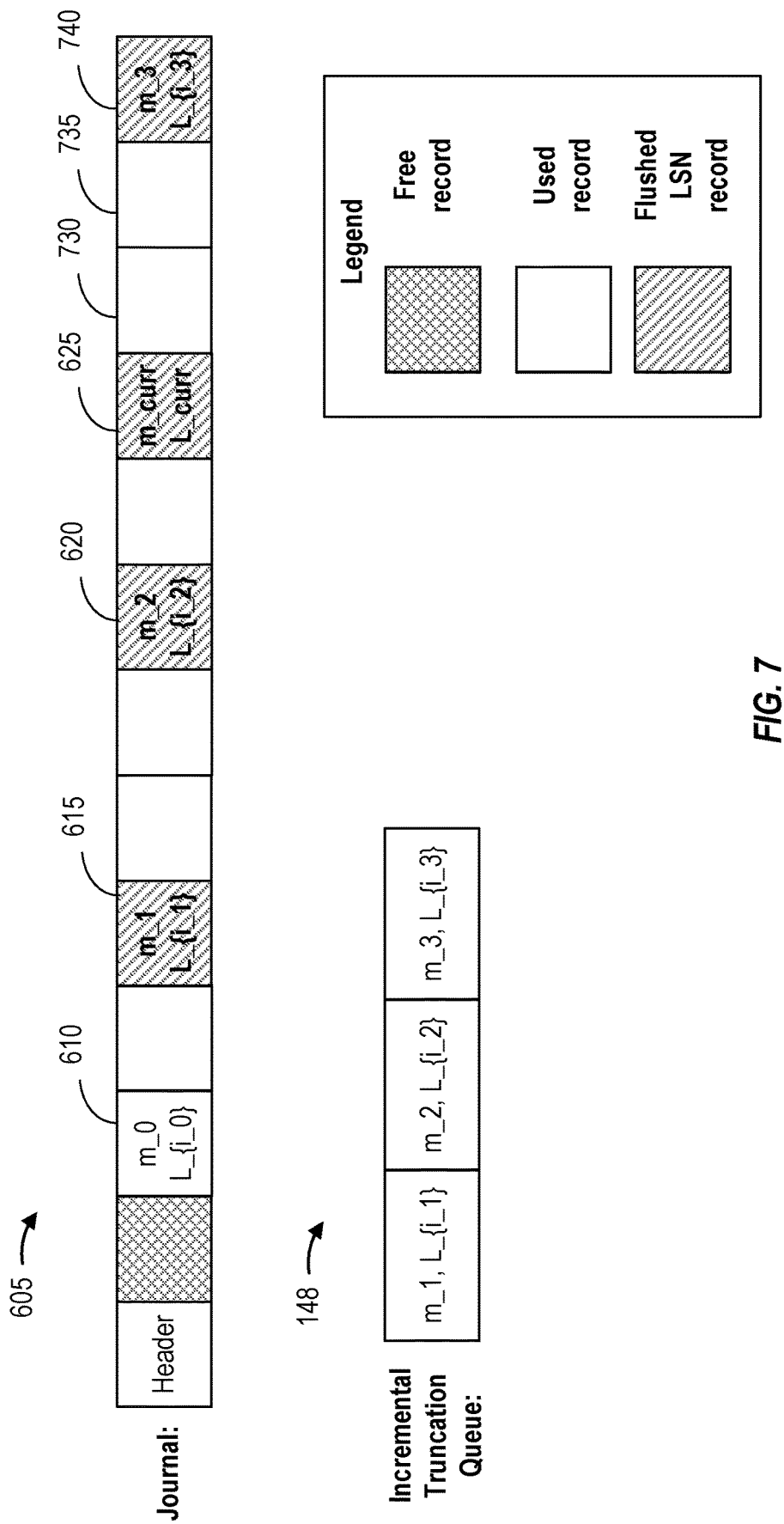
FIG. 7 is an example of adding records to the journal and incremental truncation queue, according to an example embodiment of the present disclosure.

As discussed above, LSNs may be flushed in batches. Therefore, the current LSN may be the FlushedLSN, or, the largest LSN of the batch of the flushed LSNs. As shown in FIG. 6, first record 615, second record 620, and last record 625 may be FlushedLSN records. As shown in FIG. 7, a batch of records 730, 735, and 740 may be committed and flushed, with record 740 being the FlushedLSN record. When a new record, or batch of records, are added to the journal 605, the FlushedLSN record, in this example record 740, is considered a candidate for the incremental truncation queue 148.

Returning to FIG. 5, in some embodiments, the system determines, at operation 506, whether the portion size is reached by determining whether the physical offset between the last entry of the incremental truncation queue 148, the current physical offset, and the physical offset of the FlushedLSN is equal to or larger than the size threshold. In the illustrated example in FIG. 6, $m_2$ (the physical offset of record 620) is the physical offset of the latest entry in the incremental truncation queue, the physical offset of record 630 is $m_{current}$, and records 730, 735, and 740 are the flushed records. The physical offset of the flushed records 730, 735, and 740 may be referred to as the logsToBeFlushedSize. In some embodiments, the system determines whether the portion size is reached, at operation 506, by determining whether [(physical offset of records 730, 735, 740)+(physical offset of record 625−$m_2$)]≥$\Delta_{thresh}$.

If the system determines, at operation 506, that the portion size has not been reached (e.g., [logsToBeFlushedSize+$(m_{current}-m_1)]<\Delta_{thresh}$), then the physical offset of the FlushedLSN is not added (nor is the LSN of the FlushedLSN) to the incremental truncation queue 148. Instead, as shown in FIG. 5, the system determines the threshold size is not reached and returns to operation 502 to receive additional I/Os and repeats the operations 504 and 506 until the portion size is reached. In some embodiments, the physical offset at logsToBeFlushedSize+$(m_{current}-m_1)]$ is set as the new $m_{current}$. In the illustrative example, the physical offset, $m_3$, of record 740 is set as the new $m_{current}$.

If the system determines, at operation 506, that the portion size is reached (e.g., [logsToBeFlushedSize+$(m_{current}-m_1)]\geq\Delta_{thresh}$), then, at operation 508, the physical offset of logsToBeFlushedSize+$(m_{current}-m_1)$ is added to the incremental truncation queue 148. In some embodiments, the LSN of the FlushedLSN is also added to the entry in the incremental truncation queue 148. In some embodiments, the physical offset at logsToBeFlushedSize+$(m_{current}-m_1)]$ is set as the new $m_{current}$. In the illustrative example, the physical offset, $m_3$, and LSN, $L_{i\_3}$, of record 740 are added to the incremental truncation queue 148, as shown in FIG. 7, and the physical offset, $m_3$, of record 740 is set as the new $m_{current}$.

In some embodiments, the logsToBeFlushedSize and $m_{current}-m_1$ are computed in module $LOG_{size}$, where $LOG_{size}$ is the size of the journal 605, to account for wrap-around. With wrap-around, when the journal 605 is written to the end, new records are written to the beginning of the journal.

At operation 510, the system determines whether the size of the journal 605 has reached a threshold size. The threshold size for the journal may be the total size of the journal or a configured portion of the journal size. In some embodiments, in addition or alternatively to determining the journal 605 has reached a threshold size, at operation 510, the system may determine periodically to truncate the journal 605. In this case, the system may determine whether a threshold time has passed, where the threshold time is the period for journal truncation. In some embodiments, in addition or alternatively to determining the journal 605 has reached a threshold size, at operation 510, and/or or determining a threshold time has passed, the system may determine to truncate the journal 605 based on occurrence of some other event or trigger configured for journal truncation. In this case, the system may determine whether the event has occurred.

If the system determines, at operation 510, that the journal 605 has not reached the threshold size, then, as shown in FIG. 5, the system returns to operation 502 to receive additional I/Os and repeats the operations 504-510 until the journal 605 reaches the threshold size.

Figure 8:
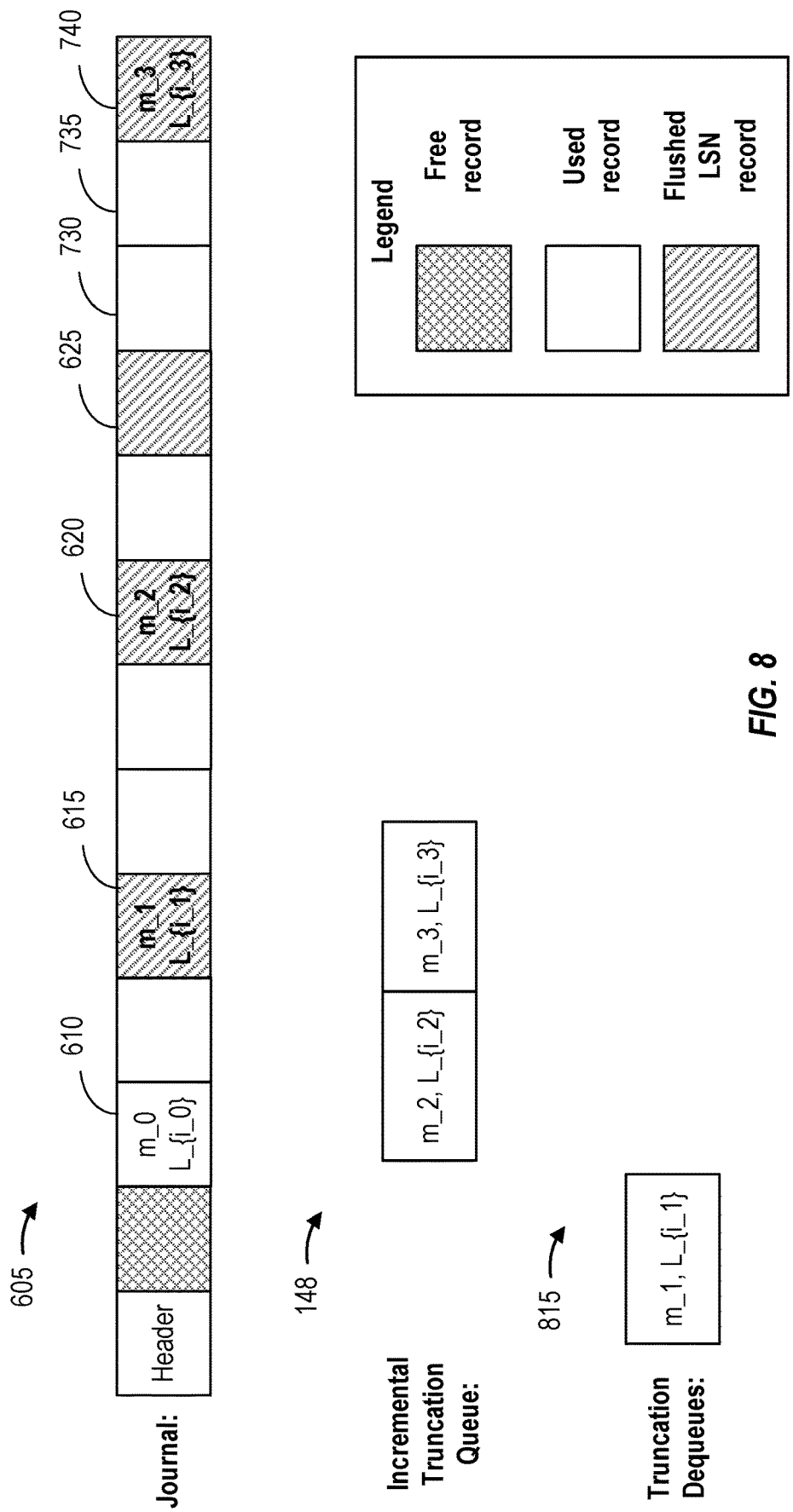
FIG. 8 is an example of truncating the journal according to the incremental truncation queue, according to an example embodiment of the present disclosure.
Figure 9:
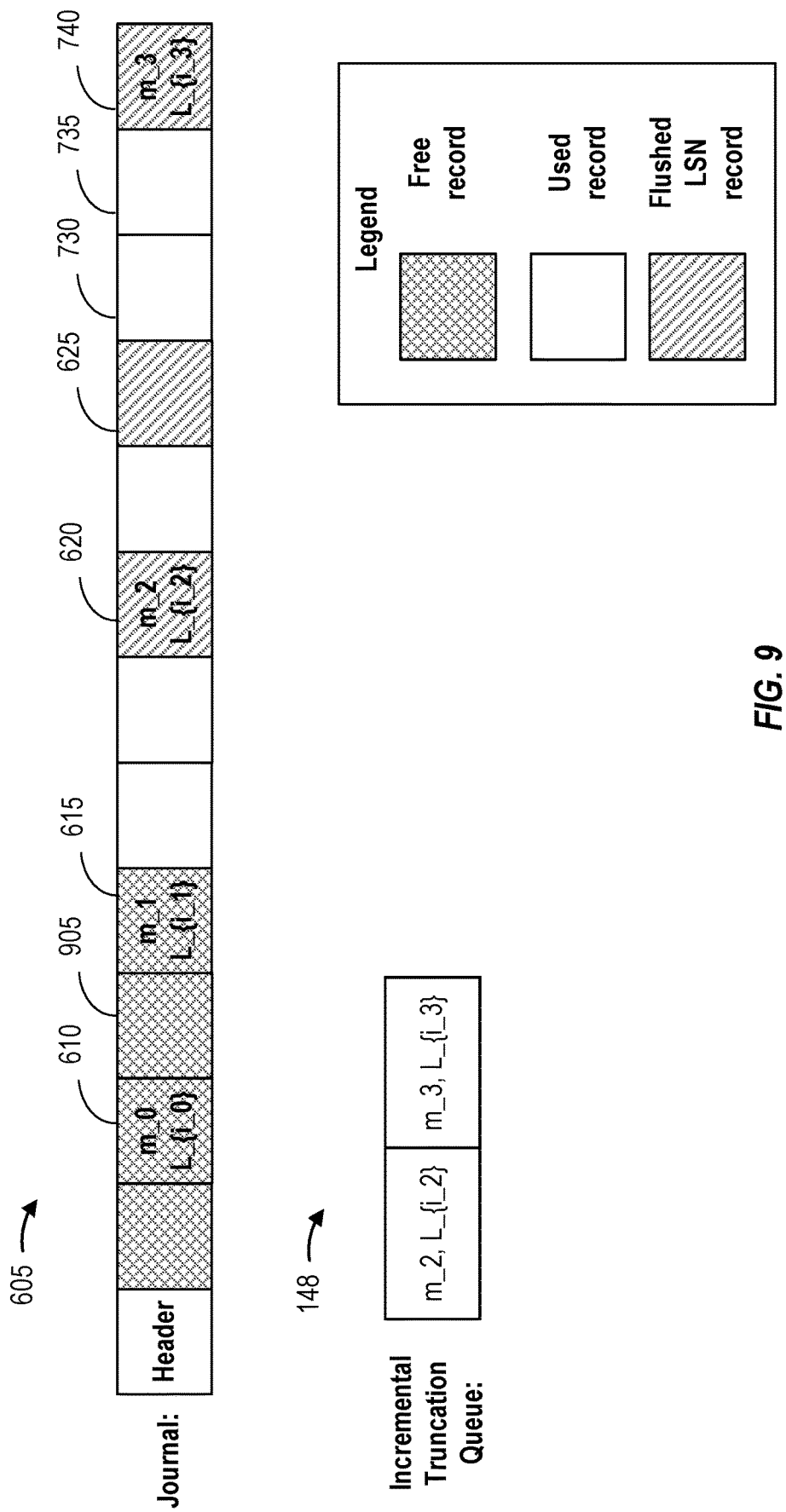
FIG. 9 is an example of the journal and incremental truncation queue after truncation, according to an example embodiment of the present disclosure.

If the system determines, at operation 510, that the journal 605 has reached the threshold size, then, as shown in FIG. 5, at operation 512, the system truncates records from the journal 605 up to the physical offset of the earliest entry of the incremental truncation queue 148. As shown in FIG. 8, the first entry 815 of the incremental truncation queue 148 is dequeued from the incremental truncation queue 148. In the illustrative example, the first entry 815 of the incremental truncation queue 148 contains the physical offset, $m_1$, (and optionally the LSN, $L_{i\_1}$) of the record 615 in journal 605. Accordingly, as shown in FIG. 9, the first entry 815 is removed from the incremental truncation queue 148, at operation 514, and the records 610, 905, and 615 up to, and including, the physical offset (and/or LSN) of the record 615 are truncated from the journal 605. Thus, in the illustrated example, $m_1-m_0$ (or the modulo $LOG_{size}$ of it, in case wrap around) space is freed in the journal 605. In some embodiments, the truncation is performed by updating the headLSN to the LSN of the next record in the journal 605 following the truncation (e.g., the LSN of the next record after record 615 in the illustrated example).

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization.

The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for journal truncation, the method comprising:
   maintaining a journal in a memory of a computing system including a plurality of records, wherein each record indicates a transaction in an ordered data structure;
   maintaining a truncation queue in the memory including one or more entries, wherein each entry in the truncation queue includes a respective physical on-disk offset associated with a different record of the plurality of records;
   determining to truncate the journal; and
   truncating records, of the plurality of records, from the journal starting from a beginning record in the journal up to a record associated with the respective physical on-disk offset included in a least recent entry of the one or more entries in the truncation queue, wherein the truncating includes removing the records from the memory.

2. The method of claim 1, wherein maintaining the truncation queue comprises:
   when adding a batch of one or more records to the journal:
      determining a physical on-disk offset between a first record, of the one or more records of the batch, having a highest log sequence number (LSN) and a second record associated with a most recent entry in the truncation queue; and
      adding the respective physical on-disk offset associated with the first record to the truncation queue when the physical on-disk offset between the first record and the second record is equal to or greater than a portion size threshold; and
      refraining from adding the respective physical on-disk offset associated with the first record to the truncation queue when the physical on-disk offset between the first record and the second record is smaller than the portion size threshold.

3. The method of claim 2, wherein the portion size threshold is a divisor of a maximum size of the journal.

4. The method claim 2, further comprising:
   maintaining a current physical on-disk offset value corresponding to a physical on-disk offset between a last record in the journal and the second record associated with the most recent entry in the truncation queue; and
   setting the current physical on-disk offset value to the respective physical on-disk offset associated with the first record when first record is added to the truncation queue.

5. The method of claim 4, wherein determining the physical on-disk offset between the first record and the second record comprises:
   determining a total physical on-disk offset of a first physical on-disk offset between the current physical on-disk offset value and the respective physical on-disk offset associated with the second record and a second physical on-disk offset between a third record and the respective physical on-disk offset associated with the first record, of the batch of one or more records, having a lowest LSN.

6. The method of claim 1, wherein each entry in the truncation queue further includes a log sequence number (LSN) of a record associated with the entry.

7. The method of claim 1, wherein the ordered data structure comprises a copy-on-write (COW) B+ tree, and wherein the journal comprises a write-ahead log (WAL) for the COW B+ tree.

8. A system comprising:
   one or more processors; and
   at least one memory, the one or more processors and the at least one memory configured to:
      maintain a journal in the memory including a plurality of records, wherein each record indicates a transaction in an ordered data structure;
      maintain a truncation queue in the memory including one or more entries,
      wherein each entry in the truncation queue includes a respective physical on-disk offset associated with a different record of the plurality of records;
      determine to truncate the journal; and
      truncate records, of the plurality of records, from the journal starting from a beginning record in the journal up to a record associated with the respective physical on-disk offset included in a least recent entry of the one or more entries in the truncation queue, wherein the truncating includes removing the records from the memory.

9. The system of claim 8, wherein the one or more processors and the at least one memory being configured to maintaining the truncation queue comprises the one or more processors and the at least one memory being configured to:
   when adding a batch of one or more records to the journal:
      determine a physical on-disk offset between a first record, of the one or more records of the batch, having a highest log sequence number (LSN) and a second record associated with a most recent entry in the truncation queue; and
      add the respective physical on-disk offset associated with the first record to the truncation queue when the physical on-disk offset between the first record and the second record is equal to or greater than a portion size threshold; and
      refrain from adding the respective physical on-disk offset associated with the first record to the truncation queue when the physical on-disk offset between the first record and the second record is smaller than the portion size threshold.

10. The system of claim 9, wherein the portion size threshold is a divisor of a maximum size of the journal.

11. The system claim 9, wherein the one or more processors and the at least one memory are further configured to:
   maintain a current physical on-disk offset value corresponding to a physical on-disk offset between a last record in the journal and the second record associated with the most recent entry in the truncation queue; and set the current physical on-disk offset value to the respective physical on-disk offset associated with the first record when first record is added to the truncation queue.

12. The system of claim 11, wherein the one or more processors and the at least one memory being configured to determine the physical on-disk offset between the first record and the second record comprises the one or more processors and the at least one memory being configured to:
determine a total physical on-disk offset of a first physical on-disk offset between the current physical on-disk offset value and the respective physical on-disk offset associated with the second record and a second physical on-disk offset between a third record and the respective physical on-disk offset associated with the first record, of the batch of one or more records, having a lowest LSN.

13. The system of claim 8, wherein each entry in the truncation queue further includes a log sequence number (LSN) of a record associated with the entry.

14. The system of claim 8, wherein the ordered data structure comprises a copy-on-write (COW) B+ tree, and wherein the journal comprises a write-ahead log (WAL) for the COW B+ tree.

15. A non-transitory computer-readable medium comprising instructions that, when executed by one or more processors of a computing system, cause the computing system to perform operations for journal truncation, the operations comprising:
maintaining a journal in a memory of the computing system including a plurality of records, wherein each record indicates a transaction in an ordered data structure;
maintaining a truncation queue in the memory including one or more entries, wherein each entry in the truncation queue includes a respective physical on-disk offset associated with a different record of the plurality of records;
determining to truncate the journal; and
truncating records, of the plurality of records, from the journal starting from a beginning record in the journal up to a record associated with the respective physical on-disk offset included in a least recent entry of the one or more entries in the truncation queue, wherein the truncating includes removing the records from the memory.

16. The non-transitory computer-readable medium of claim 15, wherein maintaining the truncation queue comprises:
when adding a batch of one or more records to the journal:
determining a physical on-disk offset between a first record, of the one or more records of the batch, having a highest log sequence number (LSN) and a second record associated with a most recent entry in the truncation queue; and
adding the respective physical on-disk offset associated with the first record to the truncation queue when the physical on-disk offset between the first record and the second record is equal to or greater than a portion size threshold; and
refraining from adding the respective physical on-disk offset associated with the first record to the truncation queue when the physical on-disk offset between the first record and the second record is smaller than the portion size threshold.

17. The non-transitory computer-readable medium of claim 16, wherein the portion size threshold is a divisor of a maximum size of the journal.

18. The non-transitory computer-readable medium claim 16, the operations further comprising:
maintaining a current physical on-disk offset value corresponding to a physical on-disk offset between a last record in the journal and the second record associated with the most recent entry in the truncation queue; and
setting the current physical on-disk offset value to the respective physical on-disk offset associated with the first record when first record is added to the truncation queue.

19. The non-transitory computer-readable medium of claim 18, wherein determining the physical on-disk offset between the first record and the second record comprises:
determining a total physical on-disk offset of a first physical on-disk offset between the current physical on-disk offset value and the respective physical on-disk offset associated with the second record and a second physical on-disk offset between a third record and the respective physical on-disk offset associated with the first record, of the batch of one or more records, having a lowest LSN.

20. The non-transitory computer-readable medium of claim 15, wherein each entry in the truncation queue further includes a log sequence number (LSN) of a record associated with the entry.

* * * * *